US008239842B2

(12) United States Patent
Aharoni et al.

(10) Patent No.: US 8,239,842 B2
(45) Date of Patent: Aug. 7, 2012

(54) IMPLICIT LINE CONTINUATION

(75) Inventors: Avner Aharoni, Seattle, WA (US); Timothy Yat Tim Ng, Bellevue, WA (US); David N. Schach, Redmond, WA (US); Paul Allen Vick, Jr., Seattle, WA (US); Lisa Feigenbaum, Bellevue, WA (US); Sophia Salim, Bothell, WA (US); Henricus Johannes Maria Meijer, Mercer Island, WA (US); Jonathan Paul Aneja, Kirkland, WA (US); Joseph Tyler Whitney, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 12/391,299

(22) Filed: Feb. 24, 2009

(65) Prior Publication Data

US 2010/0218173 A1    Aug. 26, 2010

(51) Int. Cl.
 *G06F 9/45* (2006.01)
(52) U.S. Cl. .................... 717/143; 717/140; 717/148
(58) Field of Classification Search .................. None
 See application file for complete search history.

(56) References Cited

U.S. PATENT DOCUMENTS

| | | | |
|---|---|---|---|
| 6,836,884 B1 * | 12/2004 | Evans et al. | 717/140 |
| 7,100,153 B1 * | 8/2006 | Ringseth et al. | 717/140 |
| 7,624,385 B2 * | 11/2009 | Waddington et al. | 717/143 |
| 8,099,722 B2 * | 1/2012 | Fairweather | 717/143 |
| 2002/0108106 A1 * | 8/2002 | Kramskoy et al. | 717/148 |
| 2004/0123277 A1 * | 6/2004 | Schrader et al. | 717/143 |
| 2006/0130021 A1 * | 6/2006 | Plum et al. | 717/140 |
| 2006/0190934 A1 * | 8/2006 | Kielstra et al. | 717/148 |

OTHER PUBLICATIONS

Pranod G. Joisha, The Design and Implementation of a Parser and Scanner for the MATLAB Language in the MATCH compiler, Sep. 1999, Technical Report No. CPDC-TR-9909-017, 1999 Center for Parallel and Distributed Computing Sep. 1999, pp. 8-20.*
Logris, "Trouble Writing an Edit Mode with Line Continuation Characters", Retrieved at <<http://community.jedit.org/?q=node/view/3318>>, Nov. 28, 2006, pp. 5.
"Bug #43811 Line Continuation Characters inside String are Being Removed", Retrieved at <<http://bugs.php.net/bug.php?id=43811&edit=2>>, Jan. 11, 2008, pp. 2.
"SheerPower 4GL A Guide to the SheerPower Language", Retrieved at <<http://www.ttinet.com/doc/sp4g1/sheerpower_009.html>>, Jan. 19, 2009, pp. 6.
"Implicit Line Continuations", Retrieved at <<http://www.panopticoncentral.net/archive/2008/02/27/22910.aspx>>, Feb. 27, 2008, pp. 12.
Armstrong, Damon, "The Future of .NET Languages", Retrieved at <<http://www.developerfusion.com/article/9576/the-future-of-net-languages/2/>>, Jan. 9, 2009, pp. 4.
"CEDG Meeting", Retrieved at <<http://geekswithblogs.net/Shadowin/Default.aspx>>, Jan. 14, 2009, pp. 6.
Aneja, et al., "New Features in Visual Basic 10.0 Coming in 2010", Retrieved at <<http://gemontheweb.sweetcircles.com/category/future-technologies/>>, Nov. 18, 2008, pp. 16.
"Lines and Source Format", Retrieved at <<http:///publib.boulder.ibm.com/infocenter/compbgpl/v9v111/index.jsp?topic=/com.ibm.xlf111.bg.doc/xlflr/lines_source_formats.htm>>, Jan. 19, 2009, pp. 6.

* cited by examiner

*Primary Examiner* — Thuy Dao
*Assistant Examiner* — Mongbao Nguyen
(74) *Attorney, Agent, or Firm* — Ogilvie Law Firm (57) ABSTRACT

Modified compilers and other development tools provide implied line continuation within a sequence of syntax tokens of a programming language grammar which includes multiple semantic contexts and which uses line termination as presumptive statement termination. When source code parsing encounters a line terminator adjacent a context-dependent implicit line continuation token in an associated semantic context, an explicit decision is made whether to imply line continuation. Line continuation may also be implied in response to other specified tokens.

19 Claims, 2 Drawing Sheets

IMPLICIT LINE CONTINUATION

BACKGROUND

For several decades now, computer programming languages have been designed, implemented, and revised in various ways by numerous people. Programming language design is a subject of significant academic research, with substantial commercial implications. Some languages that originated in the 1950's and 1960's, such as COBOL and FORTRAN, are still widely used, whereas some other programming languages are rarely or never used today. Some programming languages have lineages spanning decades, such as the C# language, which shares some features with its ancestors C++ and C.

Sometimes aspects of a programming language are modified in response to research in computer science. For example, experimental memory models or parallel programming models may sometimes be explored, and ultimately exploited, with the help of programming languages, by using new language features or by creating new programming languages. Many of the design and implementation efforts for new aspects of programming languages focus on defining the meaning (semantics) of those aspects, and then accurately and efficiently implementing that meaning in machines. But effort may also be needed to precisely define the symbol combinations (syntax) available for expressing meaning in the programming language.

SUMMARY

Some programming languages end statements with a visible character, such as a semicolon in the C++ programming language. Other programming languages consider the end of a line of source code to also be the end of a statement. Some languages that assume one statement per line also permit use of a line continuation character, such as an underscore in some dialects of the Basic programming language.

Some embodiments described herein provide implied line continuation within a sequence of syntax tokens of a grammar which uses line termination as presumptive statement termination. In some embodiments, when source code parsing encounters a line-terminator-token immediately preceding an implicit line continuation post-position token, an explicit decision is made whether to imply line continuation. Line continuation might be implied, for example, before tokens such as closing parentheses. Line continuation might not be implied if the line-terminator-token was encountered within a conditional compilation statement or a comment, however, despite the presence of an implicit line continuation post-position token after a line-terminator-token.

Some embodiments described herein provide implied line continuation within a sequence of syntax tokens of a grammar which includes multiple semantic contexts and which uses line termination as presumptive statement termination. In some embodiments, when source code parsing encounters a line-terminator-token adjacent a particular context-dependent implicit line continuation token in a particular semantic context, an explicit decision is made whether to imply line continuation. Line continuation might be implied in an attribute or query semantic context, for example, or in conjunction with encountering a mixfix-operator-token. However, line continuation might not be implied if the line-terminator-token was encountered within a conditional compilation statement, a comment, an assembly-target context, or a model-target context, or if the particular context-dependent implicit line continuation token encountered is a non-initial token of a sequence of contiguous tokens.

In some embodiments, parsing is accomplished using a parser embedded within a programming language compiler or programming language interpreter, which may in turn be part of an integrated development environment. In some embodiments, the programming language is a dialect of the Basic programming language, such as a version of Basic supported by Microsoft® Visual Basic® programming language tools.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

One way in which many modern programming languages can be categorized is according to how they delimit statements. Some languages assume that a physical line of text corresponds to a logical statement in the language, whereas other languages require use of termination characters to denote logical statements.

Microsoft®Visual Basic® .NET™ tools support an example of the first approach, by treating a physical line of text as a logical statement in their implementation of the Basic programming language. As a result, programs written in Visual Basic do not have statement termination characters which permit multiple statements per line and multiple lines per statement as one finds, for instance, in languages such as C++ and C#. Thus, the following example of Visual Basic source code uses physical line terminators to mark the end of logical statements:

```
Sub Main( )
    Dim x As Integer = 10
    Console.WriteLine(x)
End Sub
```

While using physical lines to delimit logical statements can often assist programmers, in some situations a single logical statement can be very long physically. As a result, Visual Basic® tools support a line continuation character (an underscore), which allows programmers to indicate that the current physical line is not the end of the logical statement, but that the compiler should instead consider the next physical line as part of the current logical statement.

For example, in the following code, example locations are marked with @1, @2, and @3 designations to aide discussion; these markers are not part of the code. Location @1 denotes Python-style implicit line continuation, in which implicit line continuation is inferred when the token at the end of the line cannot end the line based on the language grammar, for example "(", ";". Location @2 denotes an embodiment with a token on a next line implying implicit line continuation. Locations @3 denote line continuation inferred by an embodiment for the line before a contextual keyword or token, with the token identified or inferred after semantic analysis; the token is not part of language lexical analysis.

```
Function foo(@1
        ByVal col As IEnumerable(Of String)
        @2) As String
    Dim results = From s In col
                @3Where s = "some string"
                @3Select s
    Return results(0)
End Function
```

As another example, the following Visual Basic source code uses underscore both as part of identifiers and as a line continuation character to extend logical statements over multiple physical lines:

```
Sub Foo( _
        ALongVariableName__1 As Integer _
        ALongVariableName__2 As Integer _
        ALongVariableName__3 As Integer _
        )
        Console.WriteLine( _
            ALongVariableName__1 + _
            ALongVariableName__2 + _
            ALongVariableName__3)
End Sub
```

Although using the underscore character in Visual Basic code for line continuation expanded the options open to programmers, in some situations line continuation characters are not embraced by developers. Inserting the line continuation character may disturb a chain of thought as a programmer is typing. Entering the line continuation character requires a mental jump from the flow of logical statements addressing a programming problem to the physical position of text on the screen, and then a jump back to the interrupted flow of logical statements. Because the underscore may appear inside identifiers, care must also be taken to distinguish between the two different roles played by a single character.

Some embodiments described herein address such problems with the line continuation character by allowing a compiler to infer the line continuation character implicitly. Implicit line continuation may be based on a syntactic analysis of the current parsing position in the logical statement and/or based on a semantic analysis of the logical statement(s). As a result, programmers can reduce or eliminate use of the line continuation character to explicitly instruct the compiler to consider the next physical line as a continuation of the current logical statement; the compiler will instead automatically do so.

Some embodiments add a hidden (implicit) line continuation token before selected set of language constructs, or equivalently, ignore certain line terminations. For example, line continuation may be implied for the line preceding a specified token. Some embodiments to add rules about the scope of implicit line continuations, to help keep the programming language behavior predictable. For example, line continuation may be implied based on contextual keywords.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Code" means processor instructions, data (which includes constants, variables, and data structures), or both instructions and data. Unless otherwise indicated, code refers to source code written in a computer programming language.

"Statement" means a portion of source code which can be line-continued. Examples are not limited to assignment statements, loop statements, and other flow control statements, but also include declarations, and other ~statement constructs defined in a programming language grammar.

"Line terminator" means one or more characters used to terminate a physical line of source code, such as a carriage return, a line feed, a carriage return with a line feed, and so on. Line terminators for a given programming language implementation are generally given in the grammar for that language. For example, line termination characters are identified in excerpts from a Visual Basic grammar provided at the end of this document.

"Line continuation character" means one or more characters used for explicit line continuation. A line continuation character may also be used for other purposes in a language, e.g., the underscore character may be used in Visual Basic code for line continuation and/or within identifiers.

"Explicit line continuation" imposes syntactic rules, e.g., by requiring a particular character be used to indicate line continuation and by requiring that the line continuation character be placed in a particular manner, such as at the end of a physical line or the beginning of physical line or within a particular physical column. An instance of an explicit line continuation character serves only to continue the physical line. That is, the line continuation character does not also have a semantic meaning separate from its role as a line continuation device. Repeating the line continuation character in the middle of a physical line of code would create a parsing error or unintended executable code.

By contrast, "implicit line continuation" allows tokens which are selected by a programmer for their semantic meaning to also serve as aids to implicit line continuation. Their semantic meaning of such tokens could often be provided just as easily in the midst of a physical line. Some embodiments with implicit line continuation allow programmers to focus continuously on the semantics of logical statements without jumping to an awareness of physical line endings, other than as a stylistic matter, e.g., to provide whitespace and/or matching indentations. Programmers thus need not break their concentration on programming logic to attend to insertion of line continuation characters, at least not as frequently as in systems with only explicit line continuation.

"Tokens" are tokens generated by lexical analysis and/or otherwise by parsing source code. Numerous specific tokens are listed herein, designated generally by their origins or uses within source code. For example, a close-parenthesis-token is generated from a close parenthesis character ")", and a close-curly-brace-token is generated from a "}" character. A close-embedded-expression-token is generated from two adjoining characters: "%>". Some tokens are designated according to Visual Basic reserved words, e.g., from-token, aggregate-token, select-token, and so on. For convenience, a token is sometimes referred simply by the underlying character or string used in the source code, without appending the term "token", e.g., "blank line" and "blank-line-token" may each refer to a token generated by a blank line.

"Parser", "compiler", and "executable code" code should be interpreted broadly unless indicated otherwise. Thus, executable code means code generated as a side effect or based on parsing; executable code includes machine code, object code, p-code, bytecode, virtual machine code, intermediate language code, and so on. "Executable code" is used in contrast with "source code". If not otherwise expressly indicated, "compiler" serves as a nonexclusive example of compilers, interpreters, expression evaluators, and/or other source code processing tools. Compilers, interpreters, and such tools include parsers, which are themselves tools. Parsers (as the term is used herein) may perform lexical analysis. Parsers traverse source code and generate tokens based on at least a programming language's syntax, and often on the programming language's semantics as well.

Throughout this document, use of the optional plural "(s)" means that one or more of the indicated feature is present. For example, "token(s)" means "one or more tokens" or equivalently "at least one token".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
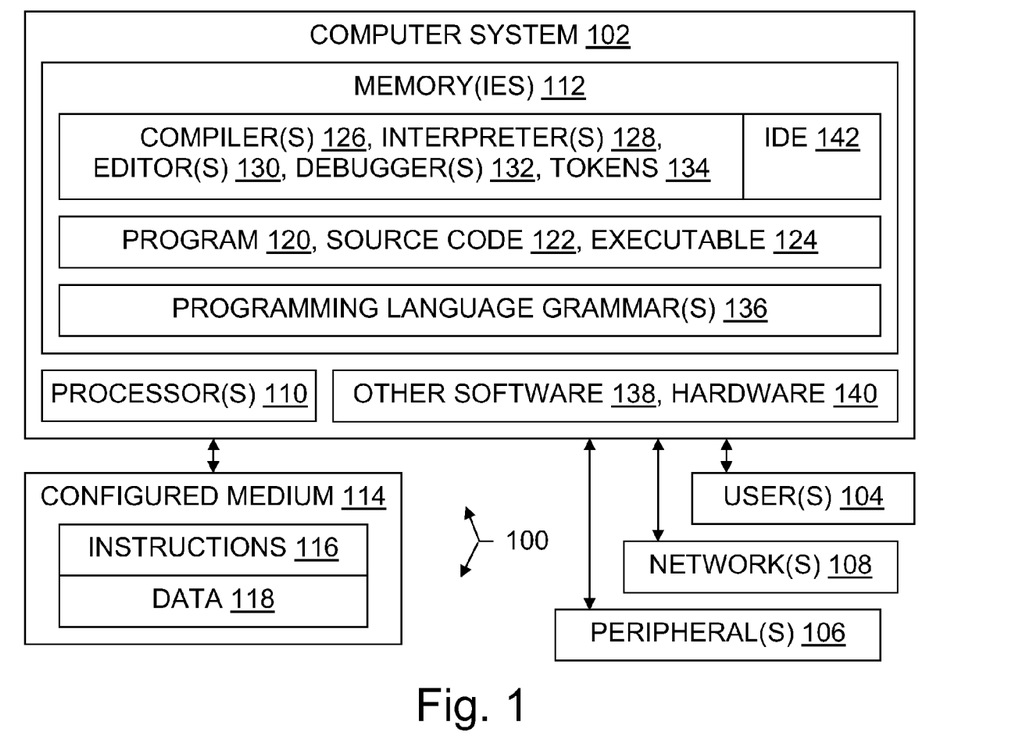
FIG. 1 is a block diagram illustrating a computer system having at least one processor, at least one memory, at least one tool for parsing computer program source code, and other items in an operating environment, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by parsing, implying line continuation, producing tokens, analyzing semantic context, and/or other operations.

Memories 112 may be of different physical types. Programs 120 and their source code(s) 122 and executable(s) 124, as well as compilers 126, interpreters 128, editors 130, debuggers 132, their tokens 134, and other items shown in the Figures may reside partially or entirely within one or more memories 112, thereby configuring those memories. For convenience, programming language grammar(s) 136 are designated separately, but it will be appreciated that such grammars 136 are generally embedded in tools such as compilers 126, interpreters 128, editors 130, and debuggers 132. An operating environment may also include other software 138, such as kernel(s), application(s), and libraries, and may include other hardware 140, such as buses, power supplies, and accelerators, for instance.

A given operating environment 100 may include an Integrated Development Environment (IDE) 142 which provides a developer with a set of coordinated software development tools. The IDE 142 and other items shown in FIG. 1 are not necessarily part of every operating environment, but are provided in the illustrated operating environment. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use programming languages suitable for implied line continuation.

Implied line continuation may be implemented in a Visual Basic® programming language environment, such as a Microsoft .NET environment. Implied line continuation may also be implemented for other programming languages that use explicit line continuation, such as for example Ruby, Python, BCPL, Jscript, Java®, and/or in JavaScript® tools (which use explicit line continuations in multiline strings; JavaScript is a mark of Sun Microsystems, Inc.).

Some existing languages continue lines explicitly by using a line continuation character which can appear on the line following a terminated-but-continued line. However, although it may be helpful to allow a line continuation character to follow a line terminator, instead of requiring that the line continuation character precede the line terminator, the programmer distraction required to place the explicit line continuation character remains. Such language implementations may be enhanced by the addition of implied line continuation as described herein.

Some existing languages continue lines between a closing-token of a syntactic construct which is delimited by an opening-token paired with a subsequent closing-token. For instance, line continuation may be performed between matching parentheses or matching braces that appear on different lines, without requiring use of a dedicated line continuation character. However, some language implementations may be enhanced by the addition of implied line continuation using semantic context analysis as described herein.

Systems

Figure 2:
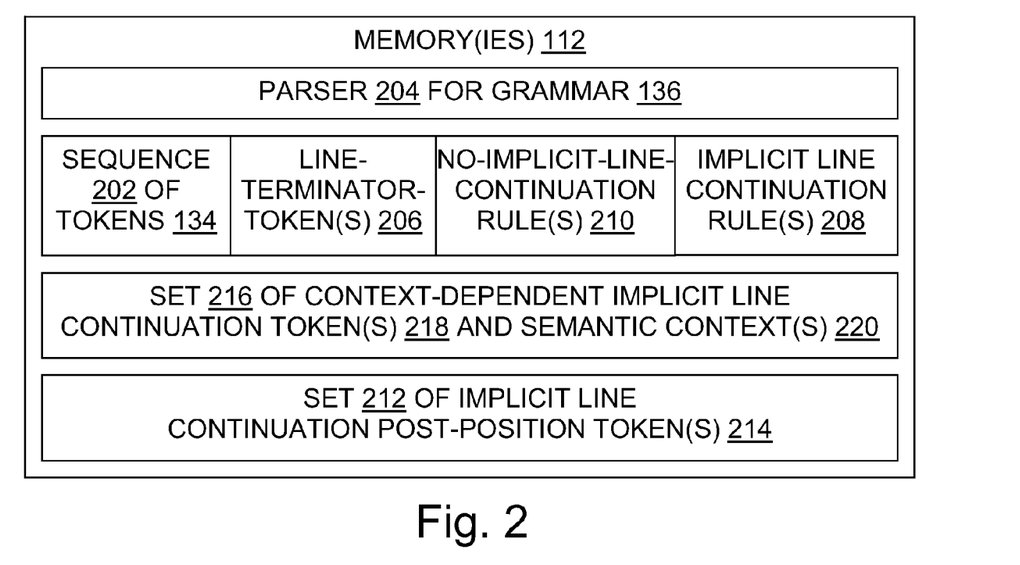
FIG. 2 is a block diagram illustrating a parser and various tokens used in parsing, in an example architecture.

FIG. 2 illustrates an architecture which is suitable for use with some embodiments. A computer system, such as system 102, has a logical processor 110 and a memory 112 in operable communication with the logical processor. A sequence 202 of tokens 134 configures the memory. The tokens 134 represent data and instructions of a program 120. The token may be produced by lexical analysis, possibly supplemented by semantic analysis, performed by a parser 204. The parser 204 configures the memory and directs the logical processor 110 to perform parsing, which conforms with and implements a programming language grammar 136 that has implied line continuation. As an example, a list at the end of this document shows some changes to the Visual Basic® version 9 grammar 136 which help support implicit line continuation. The parser may be embedded in an interpreter 128 or a compiler 126, for example, or another tool, any of which may in turn be part of an IDE 142. In a given situation and a given embodiment, line continuation inside the parser may be based on a semantic context of a line termination adjacent a specified token, on finding a specified token immediately following a line termination, or on both conditions.

Line termination is indicated in the sequence 202 of tokens by line-terminator-token(s) 206. For example, the language specification for the Visual Basic® version 9 programming language specifies a grammar 136, including:

```
LineTerminator ::=
    < Unicode carriage return character (0x000D) > |
    < Unicode linefeed character (0x000A) > |
    < Unicode carriage return character > < Unicode linefeed character > |
    < Unicode line separator character (0x2028) > |
    < Unicode paragraph separator character (0x2029) >
```

Some embodiments include implicit line continuation rules 208 for implying line continuation; numerous examples are provided herein. The rules 208 may be syntax-based, and some rules 208 may be based on semantic context as well.

Some embodiments include no-implicit-line-continuation rules 210 for not implying line continuation even though a rule 208 is met; examples of rules 210 are also provided herein. Rules 210 may be viewed as overriding rules 208. The rules 210 may be syntax-based, and some rules 210 may be based on semantic context as well.

In some embodiments, including some discussed herein, implicit line continuation rules 208 and/or no-implicit-line-continuation rules 210 are based on a set 212 of implicit line continuation post-position tokens 214. In some embodiments, including some discussed herein, implicit line continuation rules 208 and/or no-implicit-line-continuation rules 210 are based on a set 216 of context-dependent implicit line continuation tokens 218 and corresponding semantic contexts 220.

In some embodiments, implicit line continuation rules 208, no-implicit-line-continuation rules 210, token sets 212, 216, and semantic contexts 220 are implemented as "logic" in a parser 204. Such logic may include special-purpose circuitry and/or general-purpose circuitry configured by special-purpose code (at a firmware and/or higher level), for example. Any one or more of the items shown in FIG. 2, and/or processor(s) 110, may be present in parser logic, provided however that parser logic is tailored specifically to perform implicit line continuation as discussed herein, e.g., with semantic context analysis.

It will be appreciated that parsing generally includes processing code in various ways, of which implicit line continuation is a small part (except perhaps in some configurations designed for testing line continuation). Nonetheless, even small incremental improvements in the programming experience may be appreciated, particularly by programmers whose coding is facilitated by fewer interruptions in logical flow to attend to the details of physical line termination.

For example, in some embodiments the parser 204 includes logic designed with rules 208 to imply a line continuation based at least in part on locating in the sequence 202 of tokens, immediately after a line termination token 206, a closing-token of a syntactic construct which is delimited by an opening-token paired with a subsequent closing-token. Some examples of closing tokens include tokens 134 representing right parenthesis ")", right curly brace "}", right square brace "]", XML closing expression tag "%>", and "end" with a previous matching "begin".

In some embodiments, the parser 204 includes logic designed with rules 208 to imply a line continuation based at least on determining that a line termination token (or equivalently, a line termination) which is adjacent a specified context-dependent implicit line continuation token 218 is also in a programming language query expression semantic context 220. For example, in a Visual Basic program, the parser 204 logic may be designed to imply a line continuation based at least in part on the specified token 218 being one of the following operators: from-token, aggregate-token, select-token, distinct-token, where-token, let-token, join-token, skip-token, take-token, in-token, into-token, on-token, ascending-token, descending-token. More generally, these are examples of so-called "distfix" or "mixfix" operators, a familiar operator category which is also represented in other languages, as for example in the C# and Java® ternary operator (x?y:z). (Java is a mark of Sun Microsystems).

In some embodiments, the parser 204 includes logic designed with rules 210 to not imply a line continuation despite the presence of a specified token 214/218, because the specified token is in at least one of the following programming language semantic contexts 220: a conditional-compilation context, an assembly-target context, a model-target context, a comment.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network in a browser-based collaborative environment. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Following are some examples of rules 208, 210 for removing explicit line continuations in a Visual Basic® tool by implying line continuations. Some rules involve syntactic analysis with little or no semantic analysis, while others require semantic analysis to identify the context of keywords such as query keywords. A line continuation is implied in these embodiments when a line terminator is encountered:

1) after a comma (,), open parenthesis ( ( ), open curly brace ({), or open embedded expression (<%=).
2) after a member qualifier (. or .@ or . . . ), provided that something is being qualified (i.e. is not using an implicit With context).
3) before a close parenthesis ( )), close curly brace (}), or close embedded expression (%>).
4) after a less-than (<) in an attribute context.
5) before a greater-than (>) in an attribute context.
6) after a greater-than (>) in a non-file-level attribute context, that is, not allowed for assembly level or module level attributes.
7) before and after query operators (Where, Order, Select, etc.), but not between keywords of query operators that do not allow for tokens between themselves, e.g.,
    a) Order By
    b) Group Join
    c) Take While
    d) Skip While.
8) after binary operators (+, −, /, *, etc.) in an expression context.
9) after assignment operators (=, :=, +=, −=, etc.) in any context.
10) after "In" operator in the query and for each context.
11) after "From" in collection initialize.
12) after "Is" keyword in the "Select Case" and "If TypeOf . . . " statements.

Under these rules 208, 210, the line terminator represented by a token 206 is treated as if it was an explicit line continuation character, if the context is not inside a conditional compilation statement, or if any of the above tokens are followed by comments. For example, the following code is legal and meaningful when parsed in a compiler or other tool that is equipped to handle implicit line continuation under the foregoing rules 208, 210:

```
Module Test
    Sub Print(
        Param1 As Integer,
        Param2 As Integer)
        If (Param1 < Param2) Or
            (Param1 > Param2) Then
            Console.WriteLine("Not equal")
        End If
    End Function
End Module
```

Under some rules 208, 210, implicit line continuations will only be inferred directly before or after the specified token; line continuation will not be implied before or after a line continuation character. For example:

```
Dim y = 10
' Error: Expression expected for assignment to x
```

```
Dim x = _
   y
```

Under some rules 208, 210, implicit line continuations will not be allowed in conditional compilation statements; each of the following is illegal:

```
#Const a =
   1
#If a =
   1 Then
```

Under some rules 208, 210, in a Visual Basic query context the reserved word "By" is given differing treatments based on how it is used. For example, "By" may be distinct from "Group By", e.g., the following code is legal:

```
Dim averageAges =
   From cust In Customers
   Group cust.Age
   By cust.State
   Into Count( ), Average(Age)
```

However, "By" is not always implicitly continuable on its own. For example, the following code is not legal:

```
Dim londonCusts = From cust In customers
   Where cust.City = "London"
   Order
   By cust.Name Ascending
   Select cust.Name, cust.Phone
```

What distinguishes these two "By" examples cases is that an expression can appear between Group and By, so the implied continuation is legal, but not between Order and By, so the rules 208, 210 don't allow the splitting of what otherwise should be treated as one unit.

In some embodiments, the parser 204 also looks ahead for a comma when processing an Order By list, e.g.:

```
Dim londonCusts = From cust In customers
   Where cust.City = "London"
   Order By cust.Name Ascending
   , cust.City Descending
   Select cust.Name, cust.Phone
```

In some embodiments, a blank line terminates implicit line continuation. For implicit line continuation before a token 214, if there is a blank line then the parser does not infer the line continuation. Stated differently, the blank line is not a token 214 that can lead the parser to imply line continuation.

Methods

Figure 3:
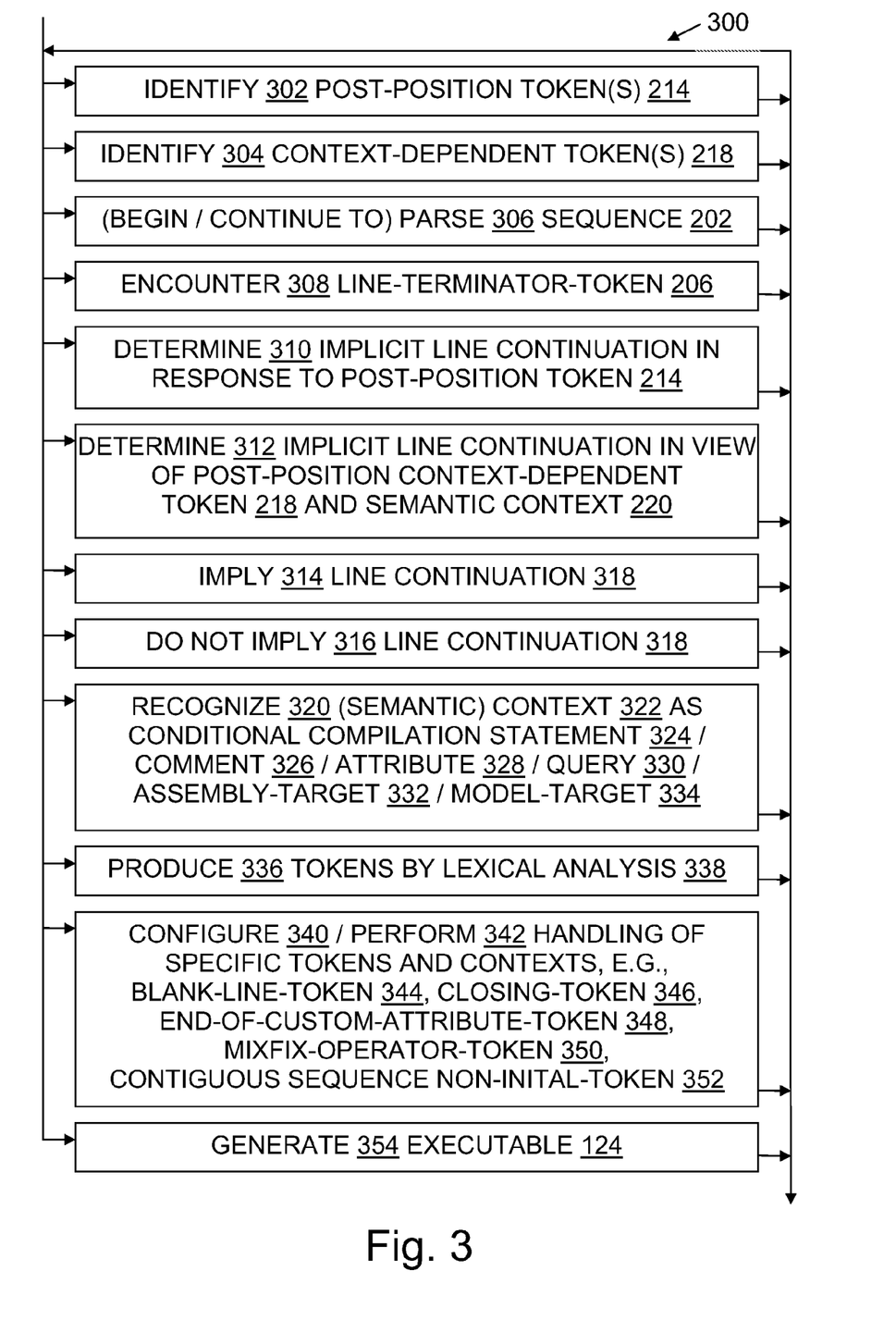
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by a compiler 126 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an identifying step 302, an embodiment identifies a set 212 of legal syntax tokens 134 as being implicit line continuation post-position tokens 214. For example, an embodiment may identify 302 one or more of the following as post-position tokens 214: close-parenthesis-token, close-curly-brace-token, close-square-brace-token, close-embedded-expression-token, close-end-token. Step 302 may be accomplished by denoting the post-position tokens 214 in a list, table, case statement, and/or other mechanism of a parser 204, for example.

During an identifying step 304, an embodiment identifies a set 216 of legal syntax tokens 134 as being context-dependent implicit line continuation tokens 218 having associated semantic contexts 220. For example, an embodiment may identify 304 an end-of-custom-attribute-token as a context-dependent token 218 having an attribute context as an associated semantic context 220. As another example, an embodiment may identify 304 a token representing a query mixfix operator (skip, take, into, etc.) as a context-dependent token 218 having a query context as an associated semantic context 220. Step 304 may be accomplished by denoting the context-dependent tokens 218 and their respective context(s) 220 in a list, table, case statement(s), and/or other mechanism of a parser 204, for example.

During a parsing step 306, an embodiment begins and/or continues parsing a sequence 202 of tokens 134. A sequence 202 may also be referred to as a "stream" of tokens 134. Parsing may include lexical analysis, syntactic analysis, and/or semantic analysis. Parsing may have results such as generation 354 of executable code, display/logging of error messages, execution of code generated from parsed code, and other results familiar to developers using an IDE 142, for example. Parsing 306 may be accomplished using tools and techniques from existing compilers or interpreters, for example, modified by teachings herein to support implicit line continuation.

During an encountering step 308 while parsing 306, an embodiment encounters a line termination, in the form of a line-terminator-token 206. An end-of-line character count, and/or end-of-line characters such as carriage return and line feed, may serve as line-terminator-tokens 206 in some embodiments. The line-terminator-token 206 may be encountered in various contexts, some of which are unrelated to implicit line continuation. However, the line-terminator-token 206 may also be encountered in contexts that do relate to implicit line continuation, such as immediately before a post-position token 214 and/or adjacent a context-dependent implicit line continuation token 218 in an associated semantic context 220.

During a determining step 310 or a determining step 312, an embodiment determines whether to imply line continuation in response to circumstances surrounding an instance of the encountering step 308. The determination is based on factors such as the presence/absence of a post-position token 214 after the line-terminator-token 206, the presence/absence of a context-dependent token 218 adjacent (before or after) the line-terminator-token 206, and/or whether the semantic context 220 of the line-terminator-token 206 is a context associated with that context-dependent token 218. Step 310 may be accomplished by parser logic.

In some situations, a determining step 310, 312 determines that no line continuation should be implied. For instance, under rule(s) 210 the determining step may determine to not imply a line continuation 318 inside a conditional compilation context even though line continuation would be implied for the same code if conditional compilation was not the context. For clarity of illustration, this aspect of determining steps 310, 312 is denoted in FIG. 3 by a step "do not imply 316 line continuation 318". Step 316 may be accomplished passively by leaving in place the encountered line-terminator-token, and continuing with the parsing accordingly.

In other situations, however, a determining step 310, 312 determines under rule(s) 208 that a line continuation should be implied. This aspect of determining steps 310, 312 is denoted in FIG. 3 by a step "imply 314 line continuation 318". Step 314 may be accomplished actively by removing the encountered line-terminator-token from the stream within the parser 204, and parsing accordingly. As a generally equivalent alternative, step 314 may be accomplished actively by adding an explicit line continuation token to the stream within the parser 204, and then parsing accordingly.

In some situations, a determining step 310, 312 recognizes 320 a syntactic context and/or a semantic context of a line-terminator-token in order to select and apply one or more rules 208, 210. For example, parser 204 logic implementing a determining step 310, 312 may recognize program source code contexts 322 such as a conditional compilation statement 324, a comment 326, an attribute 328, a query 330, an assembly-target 332, and/or a model-target 334. Contexts 322 may be specific to a particular implementation of a particular programming language, or specific to many implementations of a particular programming language, or specific to a particular IDE, for example. In the figures, contexts with a semantic aspect are designated as contexts 220, and contexts generally (syntactic, semantic, syntactic and semantic) are designated as contexts 322.

During a token producing step 336, an embodiment uses lexical analysis 338 to produce tokens 134 for parsing. Step 336 is shown separately for clarity of illustration. However, in some embodiments lexical analysis and/or token production may also be viewed as part of parsing 306.

During a given configuring step 340, an embodiment configures parser logic to perform 342 lexical analysis, syntactic analysis, semantic analysis, identifying steps 302, 304, and/or determining steps 310, 312, and related operations/steps as described herein. Configuring step 340 may include, for instance, the addition of particular post-position tokens 214 to a list or other set 212 defining mechanism, the addition of particular context-dependent tokens 218 and designations of semantic contexts 220 to a list or other set 216 defining mechanism, and changes to language grammar(s) 136 to support implicit line continuation. For example, parser logic may be modified to disable implied line continuation when a blank-line-token 344 is encountered; to imply line continuation when a closing-token 346 such as "}", "]", ")", "%>", or "END" is encountered; to imply line continuation when an end-of-custom-attribute-token 348 is encountered in an attribute context 220; to imply line continuation when a mixfix-operator-token 350 is encountered in a query context 220; and/or to not imply line continuation when a contiguous sequence non-initial-token 352 (such as "By" in Visual Basic code) is encountered in a query context 220.

The foregoing steps and their interrelationships are discussed in greater detail below, in connection with various embodiments.

Some embodiments provide a method for implying line continuation within a sequence 202 of syntax tokens of a grammar 136 which includes multiple semantic contexts 220 and which uses line termination as presumptive statement termination. The method includes identifying 304 a set of legal syntax tokens as context-dependent implicit line continuation tokens 218 having associated semantic contexts 220, and parsing 306 at least a portion of the sequence of tokens. While parsing the sequence, the method encounters 308 a line-terminator-token adjacent a particular context-dependent implicit line continuation token in a particular semantic context. Then the method implies 314 a line continuation in response to the encountering step, in view of the particular context-dependent implicit line continuation token and the particular semantic context.

Some embodiments of the method further include identifying 302 legal syntax tokens as implicit line continuation post-position tokens 214. After encountering 308 another line-terminator-token which immediately precedes an implicit line continuation post-position token, the method implies 314 another line continuation by continuing parsing of the sequence as though the line-terminator-token was omitted from the sequence 202.

In some embodiments, the set of implicit line continuation post-position tokens 214 excludes a blank-line-token 344, to allow a programmer to terminate implicit line continuation by simply entering a blank line.

In some embodiments, the set of implicit line continuation post-position tokens includes a closing-token of a syntactic construct which is delimited by an opening-token paired with a subsequent closing-token, such as a close-parenthesis-token, close-curly-brace-token, or a close-embedded-expression-token, for example.

Some embodiments provide a method including identifying 304 context-dependent implicit line continuation tokens 218 with semantic contexts 220, parsing 306, encountering 308 a line-terminator-token, and then determining 312 whether to imply line continuation in view of a particular context-dependent implicit line continuation token and the particular semantic context in which it was encountered. Some embodiments determine 312 that line continuation will be implied because parsing encountered an end-of-custom-attribute token 348 as a context-dependent token 218 in an attribute 328 semantic context.

Some embodiments determine 312 that line continuation will be implied in a query 330 semantic context when encountering certain tokens, such as specified mixfix-operator-tokens 350. In a Visual Basic® tool implementation, for instance, an embodiment may determine that line continuation will be implied in query contexts on encountering one of the following mixfix-operator-tokens 350: from-token, aggregate-token, select-token, distinct-token, where-token, let-token, join-token, skip-token, take-token, in-token, into-token, on-token, ascending-token, descending-token.

Some embodiments determine 312 that line continuation will not be implied, at least in part because the particular context-dependent implicit line continuation token encountered is a non-initial token of a sequence of contiguous tokens. In a Visual Basic® tool implementation, for instance, keyword sequences giving rise to contiguous token sequences in a query context include "Order By", "Take While", "Skip While", and "Group Join". Some embodiments accordingly do not imply line continuation on encountering non-initial tokens such as "By", "While", or "Join" after a line termination.

Some embodiments suitable for the Microsoft Visual Studio® IDE determine 312 that line continuation will not be implied because the particular semantic context is an assembly-target 332 context or a model-target 334 context. Some embodiments determine 312 that line continuation will not be implied because the line-terminator-token was encountered within a conditional compilation statement 324 or within a comment 326.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using parser 204 logic, in the form of data 118 and instructions 116, read from a removable medium 114 and/or another source such as a network connection, to form a configured medium. The configured memory 112 is capable of causing a computer system to perform method steps for transforming source code into tokens for executable code generation with implicit line continuation determinations as disclosed herein. FIGS. 1 through 3 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

ADDITIONAL EXAMPLES

The following discussion is motivated by consideration of implicit line continuation for use in Visual Basic® tools in a Microsoft® Visual Studio® development environment. Also, a list of changes to the Visual Basic® version 9 grammar designed to help support implicit line continuation is provided at the end of this document. However, it will be appreciated that aspects of the examples and heuristics discussed here may be adapted and used with other programming languages and/or other development environments.

Implicit line continuation will allow certain tokens to imply a line continuation without an explicit line continuation character ("_") following them. These tokens have been selected to cover a majority of the scenarios where it is expected users would want to continue a statement onto a new line, e.g., query keywords, comma, parentheses, and operators all can continue implicitly. Furthermore, implying 314 line continuation for a select set of tokens helps ensure that the implicit line continuation rules a user learns are simple.

Under one approach, line continuation is implied when a line terminator appears after one of the following tokens: comma, left parenthesis, left curly brace, "<%=", "<" in an attribute context, ">" in a non-file attribute context (an attribute that does not specify "Assembly" or "Module"), "Aggregate", "Distinct", "From", "Group By", "Group Join", "Join", "Let", "Order By", "Select" in a query context, "Skip", "Skip While", "Take", "Take While", "Where", "In", "Into", "On", "Ascending", "Descending", A operator, * operator, / operator, \ operator, Mod operator, unary+operator, binary+operator, ^=operator, *=operator, /=operator, \=operator, +=operator, −=operator, <<=operator, >>=operator, &=operator, <operator, <=operator, >operator, >=operator, =operator, < >operator, Is operator, IsNot operator, Like operator, & operator, And operator, Or operator, Xor operator, AndAlso operator, OrElse operator, <<operator, >>operator. However, implicit line continuation may be overridden, e.g., by not implying line continuation in a comment or a conditional compilation despite the presence of a line terminator after one of the foregoing tokens.

Under one approach, line continuation is implied when a line terminator appears before right parenthesis, right curly brace, "%>", ">" in an attribute context, or any of the following in a query context: "Aggregate", "Distinct", "From", "Group By", "Group Join", "Join", "Let", "Order By", "Select" in a query context, "Skip", "Skip While", "Take", "Take While", "Where", "In", "Into", "On", "Ascending", "Descending". However, implicit line continuation may be overridden, e.g., by not implying line continuation in a comment or a conditional compilation despite the presence of a line terminator before one of the foregoing tokens.

With regard to IDE design, the following terminology is used. "First Line" means the current line after which the implicit line continuation is to follow. A First Line is not necessarily the first line of the statement, since there may be a line continuation before. "Second Line" means the continued line, following the current implicit line continuation. A Second Line can be the last line of the statement, or it can be followed by another line continuation. "Ending Character" means the set of characters that can appear at the end of the First Line when implicit line continuation occurs. "Starting Character" means the set of characters that can start the Second Line when implicit line continuation occurs. "Indent Size" means the indent size based on the editor tool options. "Anchor position" means the column position on the first line where implicit or explicit line continuation was placed. For example:

```
foo(        <- First Line, with Ending Character '('
 |          <- Second Line
```

Under one approach, general IDE behavior for implicit line continuation will be the same as that for explicit line continuation. Some exceptions to this rule are noted below.

Regarding ending characters and ending query operators, after an Ending Character, it is ambiguous whether the developer's intent for the Second Line is to continue the First, or to leave the First in an error state and start a new statement. This is true whether a developer is editing the Second Line immediately after typing the Ending Character or returning to edit the Second Line at a later time. In either case, one approach favors the non-error scenario and assumes that user intends to continue the line. Indentation, IntelliSense® tool behavior, and PrettyListing™ tool behavior for the Second Line will all mimic the behavior they have when there is an explicit line continuation following the Ending Character. (IntelliSense® and PrettyListing are marks of Microsoft Corporation). The same approach is taken if the Ending Character is a query operator; Indentation, IntelliSense® tool behavior, and PrettyListing for the Second Line will all behave as if there were an explicit line continuation following the query operator.

Regarding starting characters and starting query operators, in any situation where the First Line could potentially be followed by a Starting Character, IntelliSense® tool behavior and PrettyListing for the Second Line under this approach will all mimic the behavior they have when there is an explicit line continuation at the end of the First Line. Similarly if the First Line ends a complete query clause, then IntelliSense® tool behavior and PrettyListing for the Second Line will all behave as if there were an explicit line continuation at the end of the First Line.

Regarding indentation, in some embodiments the behavior for the cursor position after an Enter in cases where the line has implicit or explicit line continuation proceeds under the following rule. At the end of each line that has implicit or explicit line continuation, when the user pressed "enter" the IDE will add/subtract a value equal to [Indent Size times the count of net open/close parentheses/braces] to the first char position of that line. The following are the exceptions to this rule:

1. On the first line that is continued if the count of open parentheses is 0 then indent one size to the right.
2. For XML embedded expressions, always place the cursor one char to the right of the position of the "=".
3. After ">" (in code attribute context), put the cursor in the anchor position (this is for code attributes; align them with the methods/variables they are attached to).
4. In query, after hitting Enter at the end of the first line, the cursor will be placed in the location of the From, afterwards it will behave based on normal indentation rule (i.e., keep user position from the previous line or any other rule that was specified).

In some embodiments, whenever there is a blank line immediately above the current line, indentation, IntelliSense® tools and PrettyListing tools all have their normal behaviors for the beginning of a line at that scope. In particular, a PrettyListing tool eventually gets invoked when the user does not intend to continue the line above, and has to insert a blank line to get newline support.

With regard to the XML closing expression tag "%>", in some embodiments when the user presses Enter inside an embedded expression and the cursor is on the same line as the open and close expression tag then two lines are added, the cursor is positioned in the line below and the end expression tag is positioned at the line below the cursor line.

In some embodiments, code snippets will continue to contain line continuations. In alternatives, a snippet picker omits line continuation characters when implicit line continuation is used.

In some embodiments, the following Microsoft® IDE features have no behavior changes to accommodate implicit line continuations: error correction, code model (reading and writing), attribute editor, object browser (for signatures defined using implicit line continuations), code dom/XML Gen for Initialize Component.

With regard to backward compatibility, under one approach query keywords used as user-defined fields or methods cannot follow a query statement without a blank line or statement separator in between. Consider the following sample code:

```
Module Module1
    Sub Main( )
        Dim col As Integer( ) = {1, 2, 3}
        Dim From As Integer = 2
        Dim Aggregate As
           System.Collections.Generic.IEnumerable(Of Integer)
        Do
                Aggregate = From Skip In col From Take
          In col Take While (Skip + Take) < 4 Select Take
                From += 2
          Loop While From < 4
        End Sub
End Module
```

The foregoing sample code fails to compile, because the line continuation algorithm is greedy. At the end of the first line of the query, there is now an implicit line continuation. The "From" on the following line is treated as a new From clause in the same query rather than the beginning of a new statement. As a workaround, the code will compile if there is an additional new line between the two statements, or if the pretty lister is overridden by inserting a statement separator ':' or a blank line at the end of the first statement.

As another compatibility question, consider how the compiler could respond to the following code:

```
Module Module1
    Sub Main( )
        Dim i1 = 1 +
77:     Dim i7a As Integer = i1 + 1
    End Sub
End Module
```

One response treats the code as equivalent to the following:

```
Dim i1 = 1 + 77
Dim i7a As Integer = i1 + 1
```

Another response treats the code as equivalent to the following:

```
        Dim i1 = 1 +
77:     Dim i7a As Integer = 1
With an error on "+" saying that an expression is expected
```

Some embodiments adopt the first treatment, using a strict interpretation of the grammar. That is, the compiler pulls in 77 through implicit line continuation, and then the next token is a statement separator.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

Visual Basic® Grammar Changes for Implicit Line Continuation

```
Comma ::= [ LineTerminator ], [ LineTerminator ]
OpenParenthesis ::= ( [ LineTerminator ]        CloseParenthesis ::= [ LineTerminator ] )
OpenCurlyBrace ::= { [ LineTerminator ]         CloseCurlyBrace ::= [ LineTerminator ] }
Equals ::= = [ LineTerminator ]                 ColonEquals ::= : = [ LineTerminator ]
TypeParameterList ::= OpenParenthesis Of TypeParameters CloseParenthesis
TypeParameters ::= TypeParameter | TypeParameters Comma TypeParameter
TypeParameterConstraints ::= As Constraint | As OpenCurlyBrace ConstraintList CloseCurlyBrace
AttributeBlock ::= [ LineTerminator ] < AttributeList [ LineTerminator ] > [ LineTerminataor ]
Attribute ::=
    [AttributeModifier : ] SimpleTypeName [ OpenParenthesis [AttributeArguments] CloseParenthesis]
AttributeArguments ::=
    AttributePositionalArgumentList |
    AttributePositionalArgumentList Comma VariablePropertyInitializerList | VariablePropertyInitializerList
AttributePositionalArgumentList ::=
    AttributeArgumentExpression | AttributePositionalArgumentList Comma AttributeArgumentExpression
VariablePropertyInitializerList ::=
    VariablePropertyInitializer | VariablePropertyInitializerList Comma VariablePropertyInitializer
VariablePropertyInitializer ::= IdentifierOrKeyword ColonEquals AttributeArgumentExpression
ImportsClauses ::= ImportsClause | ImportsClauses Comma ImportsClause
ImportsAliasClause ::= Identifier Equals TypeName
NamespaceDeclaration ::=
    Namespace NamespaceName StatementTerminator
    [ NamespaceMemberDeclaration+ ]
    End Namespace StatementTerminator
NamespaceName ::= Identifier | NamespaceName Period IdentifierOrKeyword
NonArrayTypeName ::= SimpleTypeName | NullableTypeName
SimpleTypeName ::= QualifiedTypeName | BuiltInTypeName
QualifiedTypeName ::=
    Identifier [ TypeArguments ] | Global Period IdentifierOrKeyword [ TypeArguments ] |
    QualifiedTypeName Period IdentifierOrKeyword [ TypeArguments ]
TypeArguments ::= OpenParenthesis Of TypeArgumentList CloseParenthesis
TypeArgumentList ::= TypeName | TypeArgumentList Comma TypeName
Implements ::= NonArrayTypeName | Implements Comma NonArrayTypeName
EnumMemberDeclaration ::= [Attributes]Identifier[Equals ConstantExpression]StatementTerminator
InterfaceBases ::= NonArrayTypeName | InterfaceBases Comma NonArrayTypeName
ArrayTypeModifier ::= OpenParenthesis [ RankList ] CloseParenthesis
RankList ::= Comma | RankList Comma
ImplementsList ::= InterfaceMemberSpecifier | ImplementsList Comma InterfaceMemberSpecifier
InterfaceMemberSpecifier ::= NonArrayTypeName Period IdentifierOrKeyword
SubSignature ::= Sub Identifier [ TypeParameterList ]
    [ OpenParenthesis [ ParameterList ] CloseParenthesis ]
FunctionSignature ::= Function Identifier [ TypeParameterList ]
    [ OpenParenthesis [ ParameterList ] CloseParenthesis ] [ As [ Attributes ] TypeName ]
ExternalSubDeclaration ::=
    [ Attributes ] [ ExternalMethodModifier+ ] Declare [ CharsetModifier ] Sub Identifier
        LibraryClause[AliasClause][OpenParenthesis[ParameterList]CloseParenthesis]
    StatementTerminator
ExternalFunctionDeclaration ::=
    [ Attributes ] [ ExternalMethodModifier+ ] Declare [ CharsetModifier ] Function Identifier
        LibraryClause [ AliasClause ] [ OpenParenthesis [ ParameterList ] CloseParenthesis ] [ As [
    Attributes ] TypeName ] StatementTerminator
```

-continued

```
ParameterList ::= Parameter | ParameterList Comma Parameter
EventHandlesList ::= EventMemberSpecifier | EventHandlesList Comma EventMemberSpecifier
EventMemberSpecifier ::=
    Identifier Period IdentifierOrKeyword | MyBase Period IdentifierOrKeyword |
    Me Period IdentifierOrKeyword
ConstructorMemberDeclaration ::=
    [ Attributes ] [ ConstructorModifier+ ] Sub New
       [ OpenParenthesis [ ParameterList ] CloseParenthesis ] LineTerminator
       [ Block ]
End Sub StatementTerminator
ParametersOrType ::= [OpenParenthesis[ParameterList]CloseParenthesis] | As NonArrayTypeName
AddHandlerDeclaration ::=
    [ Attributes ] AddHandler OpenParenthesis ParameterList CloseParenthesis LineTerminator
    [ Block ]
    End AddHandler StatementTerminator
RemoveHandlerDeclaration ::=
    [ Attributes ] RemoveHandler OpenParenthesis ParameterList CloseParenthesis LineTerminator
    [ Block ]
    End RemoveHandler StatementTerminator
RaiseEventDeclaration ::=
    [ Attributes ] RaiseEvent OpenParenthesis ParameterList CloseParenthesis LineTerminator
    [ Block ]
    End RaiseEvent StatementTerminator
ConstantDeclarators ::= ConstantDeclarator | ConstantDeclarators Comma ConstantDeclarator
ConstantDeclarator ::= Identifier [ As TypeName ] Equals ConstantExpression StatementTerminator
VariableDeclarators ::= VariableDeclarator | VariableDeclarators Comma VariableDeclarator
VariableDeclarator ::=
    VariableIdentifiers As ObjectCreationExpression |
    VariableIdentifiers [ As TypeName ] [ Equals Expression ]
VariableIdentifiers ::= VariableIdentifier | VariableIdentifiers Comma VariableIdentifier
VariableIdentifier ::= Identifier [ IdentifierModifier ]
ArraySizeInitializationModifier ::= OpenParenthesis BoundList CloseParenthesis [ ArrayTypeModifiers ]
BoundList ::= Bound | BoundList Comma Bound
PropertyMemberDeclaration ::=
    RegularPropertyMemberDeclaration | MustOverridePropertyMemberDeclaration |
    AutoPropertyMemberDeclaration
PropertySignature ::=
    Property Identifier [ OpenParenthesis [ ParameterList ] CloseParenthesis ]
       [ As [ Attributes ] TypeName ]
RegularPropertyMemberDeclaration ::=
    [ Attributes ] [ PropertyModifier+ ] PropertySignature [ ImplementsClause ] LineTerminator
    PropertyAccessorDeclaration+
    End Property StatementTerminator
MustOverridePropertyMemberDeclaration ::=
    [Attributes]MustOverridePropertyModifier+PropertySignature[ImplementsClause]StatementTerminator
AutoPropertyMemberDeclaration ::=
    [ Attributes ] [ AutoPropertyModifier+ ] Property Identifier
       [ OpenParenthesis [ ParameterList ] CloseParenthesis ]
       [As[Attributes]TypeName][Equals Expression][ImplementsClause]LineTerminator|
    [ Attributes ] [AutoPropertyModifier+ ] Property Identifier
       [ OpenParenthesis [ ParameterList ] CloseParenthesis ]
       As [ Attributes ] New [ NonArrayTypeName
       [ OpenParenthesis [ ArgumentList ] CloseParenthesis ] ] [ ObjectCreationExpressionInitializer ]
       [ ImplementsClause ] LineTerminator
InterfacePropertyMemberDeclaration ::=
    [ Attributes ] [ InterfacePropertyModifier+ ] PropertySignature StatementTerminator
AutoPropertyModifier ::=
    AccessModifier | Shadows | Shared | Overridable | NotOverridable | Overrides | Overloads
PropertyModifier ::= AutoPropertyModifier | Default | ReadOnly | WriteOnly
PropertySetDeclaration ::=
    [ Attributes ] [ AccessModifier ] Set [ OpenParenthesis [ ParameterList ] CloseParenthesis ]
LineTerminator
    [ Block ]
    End Set StatementTerminator
OperatorDeclaration ::=
    [ Attributes ] [ OperatorModifier+ ] Operator OverloadableOperator OpenParenthesis ParameterList
CloseParenthesis
       [ As [ Attributes ] TypeName ] LineTerminator
    [ Block ]
    End Operator StatementTerminator
OverloadableOperator ::=
    + | − | * | / | \ | & | Like | Mod | And | Or | Xor | ^ | << | >> |
    = | < > | > | < | > = | < = | Not | IsTrue | IsFalse | CType
RaiseEventStatement ::= RaiseEvent IdentifierOrKeyword [ OpenParenthesis [ ArgumentList ]
CloseParenthesis ] StatementTerminator
AddHandlerStatement ::= AddHandler Expression Comma Expression StatementTerminator
RemoveHandlerStatement ::= RemoveHandler Expression Comma Expression StatementTerminator
AssignmentStatement ::=
    RegularAssignmentStatement | CompoundAssignmentStatement | MidAssignmentStatement
RegularAssignmentStatement ::= Expression Equals Expression StatementTerminator
```

-continued

```
CompoundAssignmentStatement ::= Expression CompoundBinaryOperator [ LineTerminator ]
    Expression StatementTerminator
CompoundBinaryOperator ::= ^ = | * = | / = | \ = | + = | − = | & =| < < = | > > =
MidAssignmentStatement ::=
    Mid [$] OpenParenthesis Expression Comma Expression [Comma Expression] CloseParenthesis
        Equals Expression StatementTerminator
CaseClauses ::= CaseClause | CaseClauses Comma CaseClause
CaseClause ::= [Is[LineTerminator]] ComparisonOperator Expression | Expression [To Expression]
ComparisonOperator ::= = | < > | < | > | > = | < =
ForStatement ::=
    For LoopControlVariable Equals Expression To Expression [Step Expression] StatementTerminator
    [ Block ]
    [ Next [ NextExpressionList ] StatementTerminator ]
NextExpressionList ::= Expression | NextExpressionList Comma Expression
ForEachStatement ::=
    For Each LoopControlVariable In [ LineTerminator ] Expression StatementTerminator
    [ Block ]
    [ Next [ NextExpressionList ] StatementTerminator ]
RedimClauses ::= RedimClause | RedimClauses Comma RedimClause
EraseExpressions ::= Expression | EraseExpressions Comma Expression
ParenthesizedExpression ::= OpenParenthesis Expression CloseParenthesis
SimpleNameExpression ::= Identifier [ OpenParenthesis Of TypeArgumentList CloseParenthesis ]
GetTypeExpression ::= GetType OpenParenthesis GetTypeTypeName CloseParenthesis
GetTypeTypeName ::= TypeName | OpenTypeName
OpenTypeName ::= QualifiedOpenTypeName | NullableOpenTypeName
QualifiedOpenTypeName ::= Identifier [ TypeArityList ] |
    Global Period IdentifierOrKeyword [ TypeArityList ] |
    QualifiedOpenTypeName Period IdentifierOrKeyword [ TypeArityList ]
TypeArityList ::= Comma | TypeArityList Comma
NullableOpenTypeName ::= QualifiedOpenTypeName ?
TypeOfIsExpression ::= TypeOf Expression Is [ LineTerminator ] TypeName
IsExpression ::=
    Expression Is [LineTerminator] Expression | Expression IsNot [LineTerminator] Expression
GetXmlNamespaceExpression::=GetXmlNamespace OpenParenthesis[XMLNamespaceName]
CloseParenthesis
MemberAccessExpression ::=[ MemberAccessBase ] . IdentifierOrKeyword
        [ OpenParenthesis Of TypeArgumentList CloseParenthesis ]
InvocationExpression ::= Expression [ OpenParenthesis [ ArgumentList ] CloseParenthesis ]
ArgumentList ::=
    PositionalArgumentList Comma NamedArgumentList | PositionalArgumentList | NamedArgumentList
PositionalArgumentList ::= Expression | PositionalArgumentList Comma [ Expression ]
NamedArgumentList ::= IdentifierOrKeyword ColonEquals Expression |
    NamedArgumentList Comma IdentifierOrKeyword ColonEquals Expression
IndexExpression ::= Expression OpenParenthesis [ ArgumentList ] CloseParenthesis
NewExpression ::= ObjectCreationExpression | ArrayCreationExpression |
    AnonymousObjectCreationExpression | AnonymousArrayCreationExpression
ObjectCreationExpression ::=
    New NonArrayTypeName [ OpenParenthesis [ ArgumentList ] CloseParenthesis ]
        [ ObjectCreationExpressionInitializer ]
ObjectCreationExpressionInitializer ::= ObjectMemberInitializer | ObjectCollectionInitializer
ObjectMemberInitializer ::= With OpenCurlyBrace FieldInitializerList CloseCurlyBrace
ObjectCollectionInitializer ::= From CollectionInitializer
ArrayCreationExpression ::= New NonArrayTypeName ArraySizeInitializationModifier CollectionInitializer
AnonymousObjectCreationExpression ::= New ObjectMemberInitializer
StandaloneArrayCreationExpression ::= CollectionInitializer
CollectionInitializer ::= OpenCurlyBrace [ CollectionElementList ] CloseCurlyBrace
CollectionElementList ::= Expression | CollectionElementList Comma Expression
CastExpression ::=
    DirectCast OpenParenthesis Expression Comma TypeName CloseParenthesis |
    TryCast OpenParenthesis Expression Comma TypeName CloseParenthesis |
    CType OpenParenthesis Expression Comma TypeName CloseParenthesis |
    CastTarget OpenParenthesis Expression CloseParenthesis
AdditionOperatorExpression ::= Expression + [ LineTerminator ] Expression
SubtractionOperatorExpression ::= Expression − [ LineTerminator ] Expression
MultiplicationOperatorExpression ::= Expression * [ LineTerminator ] Expression
FPDivisionOperatorExpression ::= Expression / [ LineTerminator ] Expression
IntegerDivisionOperatorExpression ::= Expression \ [ LineTerminator ] Expression
ModuloOperatorExpression ::= Expression Mod [ LineTerminator ] Expression
ExponentOperatorExpression ::= Expression ^ [ LineTerminator ] Expression
RelationalOperatorExpression ::=
    Expression = [LineTerminator] Expression | Expression < > [LineTerminator] Expression |
    Expression < [ LineTerminator ] Expression | Expression > [ LineTerminator ] Expression |
    Expression < = [ LineTerminator ] Expression | Expression > = [ LineTerminator ] Expression
LikeOperatorExpression ::= Expression Like [ LineTerminator ] Expression
ConcatenationOperatorExpression ::= Expression & [ LineTerminator ] Expression
LogicalOperatorExpression ::= Not Expression |
    Expression And [ LineTerminator ] Expression | Expression Or [ LineTerminator ] Expression |
    Expression Xor [ LineTerminator ] Expression
ShortCircuitLogicalOperatorExpression ::=
    Expression AndAlso [ LineTerminator ] Expression |
```

```
    Expression OrElse [ LineTerminator ] Expression
ShiftOperatorExpression ::=
    Expression < < [ LineTerminator ] Expression | Expression > > [ LineTerminator ] Expression
LambdaExpression ::= ExpressionLambda | StatementLambda
ExpressionLambda ::=
    Function [ OpenParenthesis [ ParametertList ] CloseParenthesis ] Expression |
    Sub [ OpenParenthesis [ ParametertList ] CloseParenthesis ] Expression
StatementLambda ::= FunctionStatementLambda | SubStatementLambda
FunctionStatementLambda ::=
    Function [OpenParenthesis[ParametertList] CloseParenthesis] [As TypeName ] LineTerminator
    Block
    End Function
SubStatementLambda ::=
    Sub [ OpenParenthesis [ ParametertList ] CloseParenthesis ] LineTerminator
    Block
    End Sub
CollectionRangeVariableDeclarationList::=
    CollectionRangeVariableDeclaration |
    CollectionRangeVariableDeclarationList Comma CollectionRangeVariableDeclaration
CollectionRangeVariableDeclaration::= Identifier [ As TypeName ] In [ LineTerminator ] Expression
ExpressionRangeVariableDeclarationList::=
    ExpressionRangeVariableDeclaration |
    ExpressionRangeVariableDeclarationList Comma ExpressionRangeVariableDeclaration
ExpressionRangeVariableDeclaration::= Identifier [ As TypeName ] Equals Expression
FromQueryOperator::=[LineTerminator]From [LineTerminator] CollectionRangeVariableDeclarationList
JoinQueryOperator ::=
    [ LineTerminator ] Join [ LineTerminator ] CollectionRangeVariableDeclaration
        [ JoinQueryOperator ] [ LineTerminator ] On [ LineTerminator ] JoinConditionList
JoinConditionList ::= JoinCondition | JoinConditionList And [ LineTerminator ] JoinCondition
JoinCondition ::= Expression Equals [ LineTerminator ] Expression
LetQueryOperator::= [LineTerminator] Let [ LineTerminator ] ExpressionRangeVariableDeclarationList
SelectQueryOperator ::=
    [ LineTerminator ] Select [ LineTerminator ] ExpressionRangeVariableDeclarationList
DistinctQueryOperator::= [ LineTerminator ] Distinct [ LineTerminator ]
WhereQueryOperator::= [ LineTerminator ] Where [ LineTerminator ] BooleanExpression
PartitionQueryOperator::= [ LineTerminator ] Take [ LineTerminator ] Expression |
    [ LineTerminator ] Take While [ LineTerminator ] BooleanExpression |
    [ LineTerminator ] Skip [ LineTerminator ] Expression |
    [ LineTerminator ] Skip While [ LineTerminator ] BooleanExpression
OrderByOperator ::= [ LineTerminator ] Order By [ LineTerminator ] OrderExpressionList
OrderExpressionList ::= OrderExpression | OrderExpressionList Comma OrderExpression
GroupByQueryOperator ::=
    [ LineTerminator ] Group [ LineTerminator ] ExpressionRangeVariableDeclarationList
        [ LineTerminator ] By [ LineTerminator ] ExpressionRangeVariableDeclarationList
        [ LineTerminator ] Into [ LineTerminator ] ExpressionRangeVariableDeclarationList
AggregateQueryOperator::=
    [ LineTerminator ] Aggregate [ LineTerminator ] CollectionRangeVariableDeclaration
        [ QueryOperator+ ]
        [ LineTerminator ] Into [ LineTerminator ] ExpressionRangeVariableDeclarationList
GroupJoinQueryOperator ::=
    [ LineTerminator ] Group Join [ LineTerminator ] CollectionRangeVariableDeclaration
        [ JoinQueryOperator ] [ LineTerminator ] On [ LineTerminator ] JoinConditionList
        [ LineTerminator ] Into [ LineTerminator ] ExpressionRangeVariableDeclarationList
ConditionalExpression ::=
    If OpenParenthesis BooleanExpression Comma Expression Comma Expression CloseParenthesis |
    If OpenParenthesis Expression Comma Expression CloseParenthesis
XMLEmbeddedExpression ::= < % = [ LineTerminator ] Expression [ LineTerminator ] % >
XMLDocument ::= XMLDocumentPrologue [ XMLMisc+ ] XMLDocumentBody [ XMLMisc+ ]
XMLDocumentPrologue ::=
    < ? xml XMLVersion [ XMLEncoding ] [ XMLStandalone ] [ XMLWhitespace ] ? >
XMLEncodingNameCharacter ::=
    XMLUnderscoreCharacter | XMLLatinAlphaCharacter | XMLNumericCharacter |
    XMLPeriodCharacter | XMLDashCharacter
XMLDashCharacter ::= < Unicode dash character (0x002d) >
XMLAttribute ::=
    XMLWhitespace XMLAttributeName [ XMLWhitespace ] = [ XMLWhitespace ] XMLAttributeValue |
    XMLWhitespace XMLEmbeddedExpression
XMLCharacterReference ::= & # XMLNumericCharacter+ ; | & # x XMLHexNumericCharacter+ ;
XMLMemberAccessExpression ::= Expression . [ LineTerminator ] < XMLQualifiedName > |
    Expression . @ [ LineTerminator ] < XMLQualifiedName > |
    Expression . @ [ LineTerminator ] IdentifierOrKeyword |
    Expression . . . [ LineTerminator ] < XMLQualifiedName
```

What is claimed is:

1. A method for implying line continuation within a sequence of syntax tokens of a grammar which includes multiple semantic contexts and which uses line termination as presumptive statement termination, the method comprising the steps of:
identifying a set of legal syntax tokens as context-dependent implicit line continuation tokens having associated semantic contexts;
parsing at least a portion of the sequence of tokens;
while parsing the sequence, encountering a line-terminator-token adjacent a particular context-dependent implicit line continuation token in a particular semantic context; and then
implying line continuation in response to the encountering step in view of the particular context-dependent implicit line continuation token and the particular semantic context;
and wherein the method further comprises:
identifying legal syntax tokens as implicit line continuation post-position tokens;
encountering another line-terminator-token, which immediately precedes an implicit line continuation post-position token; and then
implying line continuation by continuing parsing of the sequence as though the line-terminator-token was omitted from the sequence.

2. The method of claim 1, wherein the set of implicit line continuation post-position tokens excludes a blank-line-token.

3. The method of claim 1, wherein the set of implicit line continuation post-position tokens includes a closing-token of a syntactic construct which is delimited by an opening-token paired with a subsequent closing-token.

4. A hardware computer-readable medium configured with data and instructions for performing a method for implying line continuation within a sequence of syntax tokens of a grammar which includes multiple semantic contexts and which uses line termination as presumptive statement termination, the method comprising the steps of:
identifying a set of legal syntax tokens as context-dependent implicit line continuation tokens having associated semantic contexts;
parsing at least a portion of the sequence of tokens;
while parsing the sequence, encountering a line-terminator-token adjacent a particular context-dependent implicit line continuation token in a particular semantic context; and then
determining whether to imply line continuation in response to the encountering step in view of the particular context-dependent implicit line continuation token and the particular semantic context;
and wherein the method further comprises:
identifying legal syntax tokens as implicit line continuation post-position tokens;
encountering another line-terminator-token, which immediately precedes an implicit line continuation post-position token; and then
implying line continuation by continuing parsing of the sequence as though the line-terminator-token was omitted from the sequence.

5. The configured medium of claim 4, wherein the determining step determines that line continuation will be implied, because the particular context-dependent implicit line continuation token encountered is an end-of-custom-attribute token and the particular semantic context is an attribute semantic context.

6. The configured medium of claim 4, wherein the determining step determines that line continuation will be implied, at least in part because the particular semantic context is a query semantic context.

7. The configured medium of claim 6, wherein the determining step determines that line continuation will be implied, at least in part because the particular context-dependent implicit line continuation token is a mixfix-operator-token.

8. The configured medium of claim 4, wherein the determining step determines that line continuation will not be implied, at least in part because the particular context-dependent implicit line continuation token encountered is a non-initial token of a sequence of contiguous tokens.

9. The configured medium of claim 4, wherein the method further comprises producing the sequence of tokens using lexical analysis of a program source code.

10. The configured medium of claim 4, wherein the determining step determines that line continuation will not be implied, at least in part because the particular semantic context is one of the following: an assembly-target context, a model-target context.

11. The configured medium of claim 4, wherein the determining step determines that line continuation will not be implied, because the line-terminator-token was encountered within at least one of the following: a conditional compilation statement, a comment.

12. A computer system comprising:
a logical processor;
a memory in operable communication with the logical processor;
a sequence of tokens configuring the memory, the tokens representing data and instructions of a program; and
a parser which configures the memory and directs the logical processor implementing a programming language grammar which has implied line continuation based on semantic analysis and at least one of the following: a semantic context of a line termination adjacent a specified token, finding a specified token immediately following a line termination; and
wherein the logical processor is further directed to perform the following: identify legal syntax tokens as implicit line continuation post-position tokens, and upon encountering another line-terminator-token, which immediately precedes an implicit line continuation post-position token, imply line continuation by continuing parsing of the sequence as though the line-terminator-token was omitted from the sequence.

13. The system of claim 12, wherein the system further comprises an integrated development environment in which the parser is embedded.

14. The system of claim 12, wherein the system further comprises at least one of the following: a programming language interpreter in which the parser is embedded, a programming language compiler in which the parser is embedded.

15. The system of claim 12, wherein the parser includes logic designed to imply a line continuation based at least in part on locating in the sequence of tokens immediately after a line termination a closing-token of a syntactic construct which is delimited by an opening-token paired with a subsequent closing-token.

16. The system of claim 12, wherein the parser includes logic designed to imply a line continuation based at least on determining that the line termination adjacent the specified token is in a programming language query expression semantic context.

17. The system of claim 16, wherein the parser logic is designed to imply a line continuation based at least in part on the specified token being one of the following: from-token, aggregate-token, select-token, distinct-token, where-token, let-token, join-token, skip-token, take-token, in-token, into-token, on-token, ascending-token, descending-token.

18. The system of claim 12, wherein the parser includes logic designed to not imply a line continuation despite the presence of the specified token, because the specified token is in at least one of the following programming language semantic contexts: a conditional-compilation context, an assembly-target context, a model-target context.

19. The system of claim 12, wherein the parser includes logic designed to imply a line continuation based on at least each of the following:
- a semantic context of a line termination adjacent a specified token,
- finding a specified token immediately following a line termination.

* * * * *